US009874155B2

United States Patent
Han et al.

(10) Patent No.: US 9,874,155 B2
(45) Date of Patent: Jan. 23, 2018

(54) METHOD OF CONTROLLING ELECTRIC CONTINUOUS VARIABLE VALVE TIMING APPARATUS

(71) Applicants: Hyundai Motor Company, Seoul (KR); Kia Motors Corporation, Seoul (KR)

(72) Inventors: Dong Hee Han, Seoul (KR); Hyun Jun Lim, Incheon (KR); Seok Hwan Ko, Suwon-si (KR); Yoon Joo Kim, Yongin-si (KR); Jungho Jang, Hwaseong-si (KR); Hyuk Im, Suwon-si (KR); Jong Il Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 537 days.

(21) Appl. No.: 14/102,269

(22) Filed: Dec. 10, 2013

(65) Prior Publication Data

US 2014/0172271 A1 Jun. 19, 2014

(30) Foreign Application Priority Data

Dec. 17, 2012 (KR) .................... 10-2012-0147779

(51) Int. Cl.
*F02D 13/02* (2006.01)
*F02D 41/06* (2006.01)
(Continued)

(52) U.S. Cl.
CPC ..... *F02D 13/0219* (2013.01); *F02D 41/0002* (2013.01); *F02D 41/062* (2013.01);
(Continued)

(58) Field of Classification Search
CPC ............. F02D 2041/001; F02D 41/401; F02D 13/0219; F02D 41/062; F02D 41/0002;
(Continued)

(56) References Cited

U.S. PATENT DOCUMENTS 6,218,799 B1 * 4/2001 Hori ................. F02D 41/009
318/15
6,492,741 B1 * 12/2002 Morimoto ............... B60L 11/12
180/65.1
(Continued)

FOREIGN PATENT DOCUMENTS

CN 101410593 A 4/2009
JP 2003-247434 A 9/2003
(Continued)

*Primary Examiner* — Joseph Dallo
(74) *Attorney, Agent, or Firm* — Morgan Lewis & Bockius LLP

(57) ABSTRACT

A method of controlling an electric continuous variable valve timing apparatus improves starting performance of an engine by a simplified phase control for the camshaft. The method, in which intake and exhaust timing of an engine is changed in accordance with a phase of the camshaft, may include: determining whether starting off of the engine is required during driving; recognizing a target phase of the camshaft for next starting of the engine; controlling the phase of the camshaft so that the intake timing of the engine is advanced in accordance with the target phase; and ending the phase control of the camshaft in accordance with a state of the engine or the camshaft.

10 Claims, 4 Drawing Sheets

(51) Int. Cl.
*F02N 19/00* (2010.01)
*F02D 41/00* (2006.01)

(52) U.S. Cl.
CPC ...... *F02N 19/004* (2013.01); *F02D 2041/001* (2013.01); *Y02T 10/18* (2013.01); *Y02T 10/42* (2013.01)

(58) Field of Classification Search
CPC ..... F01L 1/34; F01L 2800/00; F02B 2275/20; B60W 10/06; F02N 19/004; Y02T 10/42; Y02T 10/18
USPC .................. 701/105, 86, 102, 22; 318/445; 123/90.15, 90.12, 90.17, 90.23; 180/65.21
See application file for complete search history.

(56) References Cited

U.S. PATENT DOCUMENTS

| | | | | |
|---|---|---|---|---|
| 6,505,586 | B1* | 1/2003 | Sato | F02D 13/0238 123/90.15 |
| 7,819,098 | B2* | 10/2010 | Choi | F01L 1/344 123/90.15 |
| 8,851,217 | B2* | 10/2014 | Schiek | B60W 10/06 180/65.265 |
| 2001/0028233 | A1* | 10/2001 | Omata | B60K 6/485 318/445 |
| 2002/0014215 | A1* | 2/2002 | Ishii | F01L 1/34 123/90.17 |
| 2004/0216719 | A1* | 11/2004 | Condemine | F02D 41/042 123/406.47 |
| 2005/0199200 | A1* | 9/2005 | Miyakoshi | F02D 13/0219 123/90.17 |
| 2006/0254550 | A1* | 11/2006 | Lewis | F01L 9/04 123/179.3 |
| 2007/0106441 | A1* | 5/2007 | Ono | B60W 10/06 701/36 |
| 2007/0175427 | A1* | 8/2007 | Inoue | F02D 13/08 123/90.17 |
| 2007/0233357 | A1* | 10/2007 | Sugai | B60K 6/48 701/105 |
| 2008/0288155 | A1* | 11/2008 | Watanabe | F01L 1/34 701/102 |
| 2009/0126663 | A1* | 5/2009 | Choi | F01L 1/344 123/90.17 |
| 2009/0157281 | A1* | 6/2009 | Yoon | F01L 1/344 701/105 |
| 2009/0188459 | A1* | 7/2009 | Fleckner | F02N 19/005 123/179.3 |
| 2009/0255510 | A1* | 10/2009 | Mashiki | F01L 1/352 123/347 |
| 2009/0288621 | A1* | 11/2009 | Mikawa | F01L 1/344 123/90.15 |
| 2010/0224153 | A1* | 9/2010 | Ichimoto | F01L 1/34 123/90.17 |
| 2011/0040432 | A1* | 2/2011 | Kaltenbach | B60K 6/365 701/22 |
| 2011/0231077 | A1* | 9/2011 | Nakamura | B60K 6/48 701/102 |
| 2012/0174883 | A1* | 7/2012 | Kokubo | F01L 1/352 123/90.15 |
| 2013/0080027 | A1* | 3/2013 | Mikawa | F02D 13/0238 701/102 |

FOREIGN PATENT DOCUMENTS

| | | |
|---|---|---|
| JP | 2005-291200 A | 10/2005 |
| JP | 2008-190495 A | 8/2008 |
| JP | 2008190495 * | 8/2008 |
| JP | 2009-222025 A | 10/2009 |
| JP | 2012-145036 A | 8/2012 |
| KR | 10-2002-0011109 A | 2/2002 |

* cited by examiner

METHOD OF CONTROLLING ELECTRIC CONTINUOUS VARIABLE VALVE TIMING APPARATUS

CROSS-REFERENCE TO RELATED APPLICATION

The present application claims priority of Korean Patent Application Number 10-2012-0147779 filed Dec. 17, 2012, the entire contents of which application is incorporated herein for all purposes by this reference.

BACKGROUND OF INVENTION

Field of Invention

The present invention relates to a method of controlling an electric continuous variable valve timing apparatus, and more particularly, to a method of controlling an electric continuous variable valve timing apparatus, which improves starting performance of an engine.

Description of Related Art

In general, a continuous variable valve timing (CVVT) apparatus refers to an apparatus which adjusts opening and closing timing of a valve of an engine. Particularly, as the CVVT apparatus controls an intake valve in accordance with a driving condition, output of the engine and fuel efficiency may be improved, and exhaust gas may be reduced.

The opening and closing operations of exhaust and intake valves are performed by a rotation of a camshaft.

A general CVVT apparatus is a hydraulic vane type CVVT apparatus. The vane type CVVT apparatus is provided in a small space, and has a merit of being inexpensive.

However, because the vane type CVVT apparatus uses lubricant of the engine as working oil, there is a drawback in that it is difficult to expect fast and accurate response in a state in which pressure of oil is low. Particularly, in a case in which pressure of engine oil is not sufficient, such as in an idle state of the engine, in a high temperature state, in a start state, or the like, a relative phase variation of the camshaft is difficult, and excessive leakage of exhaust gas may occur. In addition, by a shortfall of pressure of oil and excessive viscosity of oil at the time of cold starting, an operation of the hydraulic CVVT apparatus may be impossible. Therefore, starting is performed at a parking position fixed by a lock pin.

An electric CVVT apparatus, which may electrically control valve timing, has been developed to supplement the drawback. However, in the electric CVVT apparatus, at the time of an abnormal operation in which a phase of the camshaft is excessively advanced or retarded, excessive noise may occur due to interference between the camshaft and a stopper of the CVVT apparatus.

In addition, in the electric CVVT apparatus, by strategic use of late intake valve closing, when a closing operation of an intake valve is retarded, an effective compression ratio is lowered, and starting is not easy. Meanwhile, starting may be performed by operating a phase of a cam to a position where starting is possible by the CVVT apparatus during cranking, but a starting retard according to an advance of the camshaft may occur.

As a method of overcoming the aforementioned problem, a phase of the camshaft may be adjusted to a position where next starting is advantageous at the time of starting off.

However, in a phase control of the camshaft by the CVVT apparatus at the time of starting off, when it is required not only to determine whether a moving direction of the camshaft, in which a phase of the crankshaft reaches a target position for starting during cranking, is an advance direction or a retard direction, and but also to move the camshaft from a retard position to an advance position, a starting retard due to a response retard of the CVVT apparatus may occur.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method of controlling an electric continuous variable valve timing apparatus, which improves starting performance of an engine.

In addition, the present invention has been made in an effort to provide a method of controlling an electric continuous variable valve timing apparatus, which simplifies a phase control for a camshaft according to the electric continuous variable valve timing apparatus.

Various aspects of the present invention provide for a method of controlling an electric continuous variable valve timing apparatus, in which intake and exhaust timing of an engine is changed in accordance with a phase of the camshaft, the method including: determining whether starting off of the engine is required during driving; recognizing a target phase of the camshaft for next starting of the engine; controlling the phase of the camshaft so that the intake timing of the engine is advanced in accordance with the target phase; and ending the phase control of the camshaft in accordance with a state of the engine or the camshaft.

The method of controlling the electric continuous variable valve timing apparatus may further include starting the engine; detecting a driving environment during driving the vehicle after starting the engine; and controlling the intake timing of the engine to be predetermined timing in accordance with the detected driving environment.

The starting of the engine may include recognizing a key on; recognizing a target phase of the camshaft for present starting of the engine; comparing the phase of the camshaft with the target phase; and controlling the phase of the camshaft so that the intake timing of the engine is retarded if the phase of the camshaft is present further toward a direction in which the intake timing of the engine is advanced, than the target phase.

The target phase of the camshaft may be an optimum phase of the camshaft for next starting after starting off of the engine.

If starting off of the engine is required during driving, the target phase of the camshaft for next starting of the engine may be recognized.

If starting off of the engine is not required during driving, the driving environment may be detected, and the intake timing of the engine may be controlled to be predetermined timing in accordance with the detected driving environment.

The controlling of the phase of the camshaft so that the intake timing of the engine is advanced, may include comparing a rotation speed of the engine with an allowable minimum rotation speed; comparing a minimum advance phase of the camshaft, which allows the intake timing of the engine to be advanced by a predetermined minimum value, with the phase of the camshaft; and comparing a maximum advance phase of the camshaft, which allows the intake timing of the engine to be advanced to a predetermined maximum value, with the phase of the camshaft.

If the rotation speed of the engine is higher than the minimum rotation speed, the phase of the camshaft may be controlled so that the intake timing of the engine is advanced, and if the rotation speed of the engine is not higher than the minimum rotation speed, the phase control for the camshaft may end.

In a case in which the rotation speed of the engine is higher than the minimum rotation speed, if the phase of the camshaft is present further toward a direction in which the intake timing of the engine is retarded, than the minimum advance phase, the phase of the camshaft may be controlled so that the intake timing of the engine is advanced, and if the phase of the camshaft is not present further toward a direction in which the intake timing of the engine is retarded, than the minimum advance phase, the phase of the camshaft and the maximum advance phase may be compared with each other.

In a case in which the rotation speed of the engine is higher than the minimum rotation speed, the phase of the camshaft may be controlled to reach the maximum advance phase, and when the phase of the camshaft reaches the maximum advance phase, the phase control for the camshaft may end.

The phase of the camshaft may be controlled to be always present further toward a direction in which the intake timing of the engine is advanced, than the target phase.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
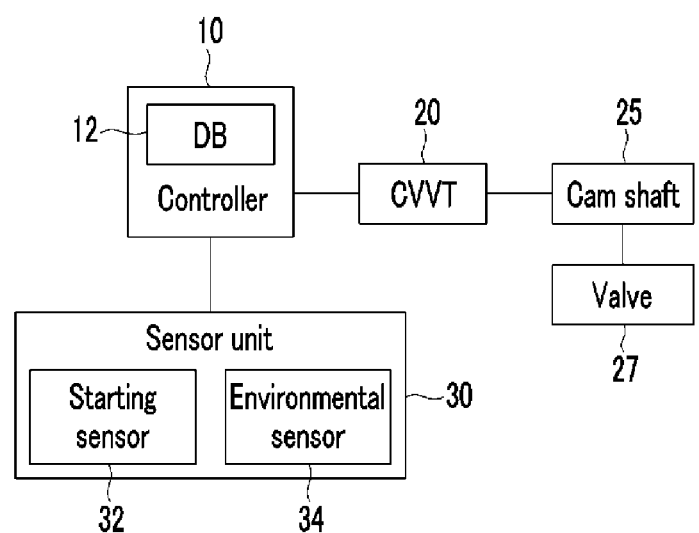
FIG. 1 is a schematic diagram of an exemplary electric continuous variable valve timing apparatus according to the present invention.

FIG. 1 is a schematic diagram of an electric continuous variable valve timing apparatus according to various embodiments of the present invention.

As illustrated in FIG. 1, an electric continuous variable valve timing (CVVT) apparatus according to various embodiments of the present invention includes a controller 10, a sensor unit 30, a CVVT operating unit 20, and a camshaft 25.

The controller 10 controls an operation of the CVVT apparatus according to various embodiments of the present invention. In addition, the controller 10 may be a typical electronic control unit (ECU) which generally controls electronic devices in a vehicle.

The sensor unit 30 transmits a signal with respect to information of the vehicle to the controller 10. In addition, the controller 10 controls an operation of the CVVT apparatus in accordance with information transmitted from the sensor unit 30.

The sensor unit 30 includes a starting sensor 32, and an environmental sensor 34, and the controller 10 includes a data base 12.

The starting sensor 32 may be a set of sensors including a plurality of sensors. In addition, the starting sensor 32 detects a state of an engine such as starting ON/OFF states, a key-on state, and the like. Moreover, the starting sensor 32 detects information on manipulation of a pedal and a handle by a driver, opening and closing states of a door, or the like, and transmits the information to the controller 10, thereby allowing the controller 10 to determine a demand of the driver. Particularly, the demand of the driver may be a demand for starting ON/OFF.

The environmental sensor 34 may be a set of sensors including a plurality of sensors. In addition, the environmental sensor 34 detects external factors of the vehicle such as atmospheric pressure, an atmospheric temperature, roughness of road surfaces, slopes, and the like, and internal factors of the vehicle such as a coolant temperature, an interior room temperature, an engine speed, and the like. That is, the environmental sensor 34 transmits information on an overall state and travel of the vehicle to the controller 10.

The data base 12 is a set of data in which various predetermined values are stored in accordance with a driving situation of the vehicle. In addition, the data base 12 is an interior memory of the controller 10, which stores determination and control of the controller 10 with respect to specific situations. Moreover, the data base 12 allows data such as various predetermined values which are necessary to control the vehicle in accordance with a state and travel of the vehicle to be collected in the controller 10.

The CVVT operating unit 20 is operated by the controller 10. In addition, the CVVT operating unit 20 may include a plurality of gears, an eccentric cam, a direction adjusting apparatus, and the like. The CVVT operating unit 20 is operated so that valve timing of the engine is controlled by constituent elements.

The camshaft 25 includes a cam, or is a shaft integrally formed with a cam. In addition, the camshaft 25 is connected to the CVVT operating unit 20. Moreover, the camshaft 25 is connected to a valve apparatus 27. Here, the valve apparatus 27 is a valve assembly including an intake valve, and an exhaust valve. The camshaft 25 includes at least two cams, and one or more cams are disposed to come into contact with the intake and exhaust valves, respectively. That is, the intake and exhaust valves are opened and closed by a rotation of the camshaft 25. Meanwhile, as a position of the camshaft 25 is changed, opening and closing timing of the intake and exhaust valves may be changed.

Because connections and operations of the CVVT operating unit 20, the camshaft 25, and the valve apparatus 27 are obvious to a person of ordinary skill in the art (hereinafter referred to as the person skilled in the art), a more detailed description will be omitted. In addition, configurations and operating methods of the CVVT operating unit 20, the camshaft 25, and the valve apparatus 27 may be variously changed by design of the person skilled in the art.

Figure 2:
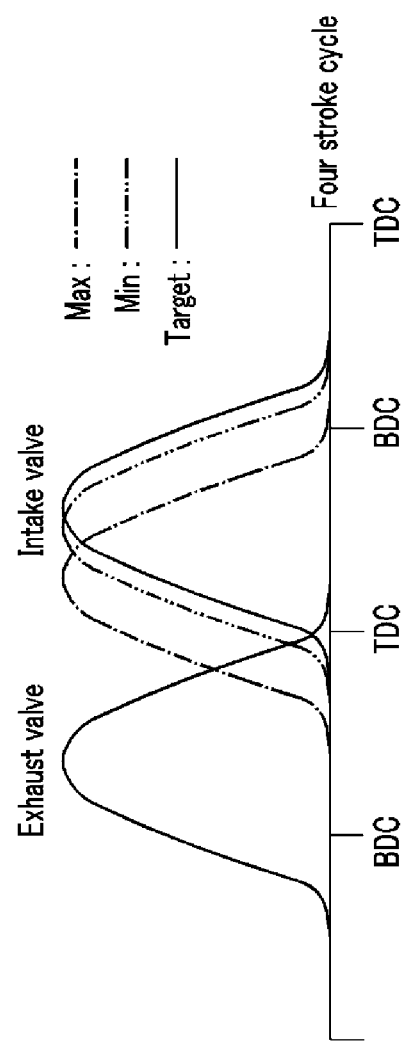
FIG. 2 is a graph illustrating an exemplary phase of a camshaft of the electric continuous variable valve timing apparatus according to the present invention.

FIG. 2 is a graph illustrating a phase of a camshaft of the electric continuous variable valve timing apparatus according to various embodiments of the present invention.

A horizontal axis of the graph illustrated in FIG. 2 indicates one cycle of four strokes. In addition, the horizontal axis of the graph includes two piston bottom dead centers (BDC) and two piston top dead centers (TDC). Moreover, a curved line E at the left of the drawing indicates a phase of an exhaust valve side cam, and a curved line at the right of the drawing indicates a phase of an intake valve side cam.

Meanwhile, the curved line indicating the phase of the intake valve side cam includes a Target curved line, a Max curved line, and a Min curved line. In FIG. 2, the Target curved line is illustrated as a solid line, the Max curved line is illustrated as an alternated dash line, and the Min curved line is illustrated as a two point chain line.

The Target curved line indicates a target phase of the intake valve side cam for starting the engine, and the Max curved line and the Min curved line indicate phases of the intake valve side cam, which are changed so that the intake valve is controlled to be advanced. In addition, the Max curved line corresponds to a case in which the intake valve is maximally advanced, the Min curved line corresponds to a case in which the intake valve is minimally advanced. That is, the Max curved line and Min curved line indicate a maximum value (Max) and a minimum value (Min) of the advance control, and the maximum value (Max) and the minimum value (Min) of the advance control may be set by the person skilled in the art. Here, when defining an advance direction as '+', the Max curved line is the phase of the camshaft 25 which is advanced by +15 CAD (crank angle degree), and the Min curved line is the phase of the camshaft 25 which is advanced by +5 CAD.

According to various embodiments of the present invention, the phase of the camshaft 25 is controlled to be always advanced from the target phase within a range from +5 CAD to +15 CAD.

Figure 3:
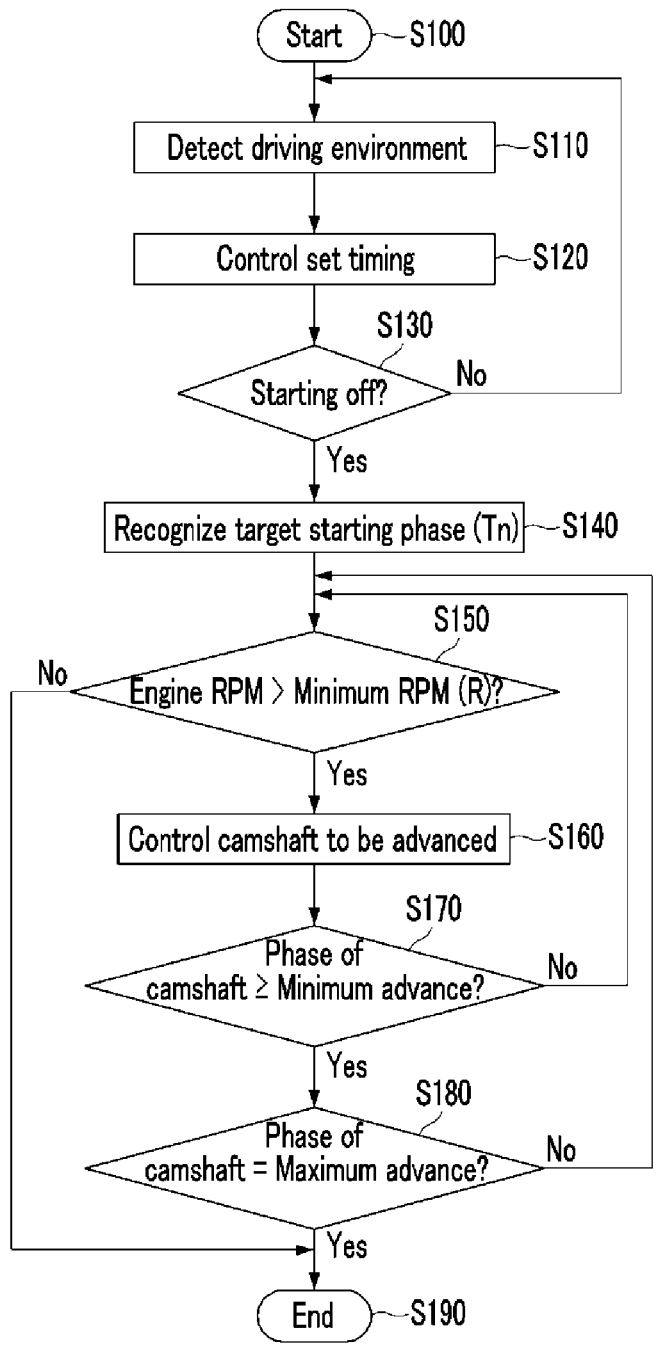
FIG. 3 is a flowchart of an exemplary method of controlling the electric continuous variable valve timing apparatus according to the present invention.

FIG. 3 is a flowchart of a method of controlling the electric continuous variable valve timing apparatus according to various embodiments of the present invention.

As illustrated in FIG. 3, when the engine is started (S100), the controller 10 detects a driving environment of the vehicle (S110). Here, the driving environment of the vehicle is detected by information transmitted from the environmental sensor 34.

When the driving environment of the vehicle is detected (S110), the controller 10 controls intake timing of the engine to be predetermined timing in accordance with the detected driving environment (S120). Here, the predetermined timing is one of values stored in advance in the data base 12 so as to correspond to various driving environments. That is, the controller 10 controls the intake timing of the engine in accordance with the data stored in the data base 12.

While the vehicle is driven while the intake timing of the engine is controlled to be the predetermining timing, the controller 10 determines whether starting off of the engine is required in accordance with information transmitted from the starting sensor 32 (S130).

In a case in which the controller 10 determines that the starting off of the engine is required while the vehicle is driven, the controller 10 recognizes a target phase Tn of the camshaft 25 for next starting of the engine (S140). Here, the target phase Tn for the next starting may be obtained by predicting next starting conditions based on data stored in advance in the data base 12 in accordance with starting conditions such as a temperature of coolant, atmospheric pressure, an atmospheric temperature, and the like. In addition, the target phase Tn for the next starting may be an optimum phase of the camshaft for the next starting after starting off of the engine. In contrast, in a case in which the controller 10 determines that the starting off of the engine is not required while the vehicle is driven, the process is returned to step S110.

Hereinafter, a process in which the controller 10 controls the phase of the camshaft 25 so that the intake timing of the engine is advanced in accordance with the target phase Tn for the next starting will be described.

The controller 10 compares a present rotation speed of the engine with a minimum rotation speed R at which the advance control the camshaft 25 is allowed (S150). Here, the minimum rotation speed R is preset and stored in the data base 12. In addition, the minimum rotation speed R may be 80 RPM. Moreover, in a case in which the rotation speed of the engine is lowered to be equal to or less than a predetermined speed, an excessive load may occur when the advance and retard control of the camshaft 25 is performed or the advance and retard control may be impossible.

If the rotation speed of the engine is higher than the minimum rotation speed R, the controller 10 controls the phase of the camshaft 25 so that the intake timing of the engine is advanced (S160). In contrast, if the rotation speed of the engine is not higher than the minimum rotation speed R, the controller 10 ends the phase control for the camshaft 25 (S190).

While the camshaft 25 is advance controlled (S160), the controller 10 compares a minimum advance phase of the camshaft 25, which allows the intake timing of the engine to be advanced to the predetermined minimum value (Min), with the present phase of the camshaft 25 (S170). Here, if the present phase of the camshaft 25 is present further toward a direction in which the intake timing of the engine is retarded, than the minimum advance phase, the process is returned to step S150.

In contrast, if the present phase of the camshaft 25 is not present further toward a direction in which the intake timing of the engine is retarded, than the minimum advance phase, the controller 10 compares a maximum advance phase of the camshaft 25, which allows the intake timing of the engine to be advanced to a predetermined maximum value, with the present phase of the camshaft 25 (S180).

If the phase of the camshaft 25 does not reach the maximum advance phase, the process is returned to step S150. In contrast, if the phase of the camshaft 25 reaches the maximum advance phase, the phase control of the camshaft 25 ends (S190).

That is, if a rotation speed of the engine is reduced to reach the minimum rotation speed R or the phase of the camshaft 25 is advanced to reach the maximum advance phase at the time of starting off, the phase control of the camshaft 25 ends (S190).

Figure 4:
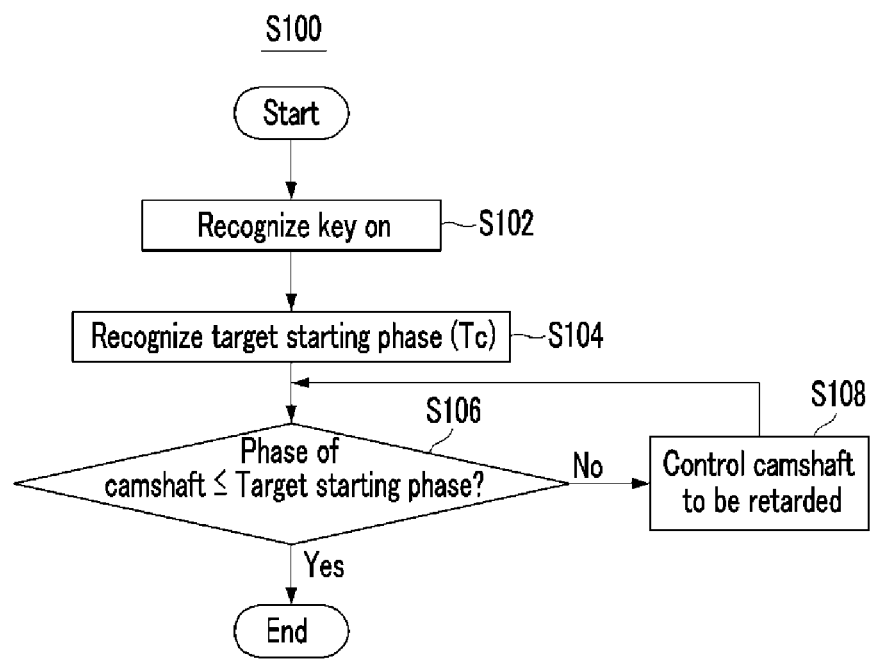
FIG. 4 is an additional flowchart of an exemplary method of controlling the electric continuous variable valve timing apparatus according to the present invention.

FIG. 4 is an additional flowchart of a method of controlling the electric continuous variable valve timing apparatus according to various embodiments of the present invention.

As illustrated in FIG. 4, a step (S100) of starting the engine includes a step S102 in which the controller 10 recognizes a key on by receiving information from the starting sensor 32, a step S104 in which the controller 10 recognizes a target phase Tc of the camshaft 25 for present starting of the engine, a step S106 in which the controller 10 compares the phase of the camshaft 25 with the target phase Tc for the present starting, and a step S108 in which the controller 10 controls the phase of the camshaft 25 so that the intake timing of the engine is retarded.

Here, the target phase Tc for the present starting may be obtained from data stored in advance in the data base 12 in accordance with starting conditions such as a temperature of coolant, atmospheric pressure, an atmospheric temperature, and the like. Meanwhile, if the phase of the camshaft 25 is present further toward a direction in which the intake timing of the engine is advanced, than the target phase Tc for the present starting, step S108 is performed. In addition, if the phase of the camshaft 25 is not present further toward a direction in which the intake timing of the engine is advanced, than the target phase Tc for the present starting, step S110 is performed.

As described above, according to various embodiments of the present invention, the phase of the camshaft is controlled to be further toward an advance direction than the optimum starting phase at the time of starting off, and therefore an operation of determining whether a moving direction required to the camshaft during cranking is an advance direction or a retard direction may not be necessary. In addition, the camshaft is naturally moved in a retard direction by cranking torque, and as a result, the camshaft is fast moved to a target starting position, and response of the continuous variable valve timing apparatus may be improved.

For convenience in explanation and accurate definition in the appended claims, the terms left and right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling an electric continuous variable valve timing apparatus, wherein intake and exhaust timing of an engine is changed in accordance with a phase of the camshaft, the method comprising:
   determining whether stop of the engine is required during driving;
   recognizing a target phase of the camshaft for next starting of the engine;
   controlling the phase of the camshaft so that the intake timing of the engine is advanced in accordance with the target phase; and
   ending the phase control of the camshaft in accordance with a state of the engine or the camshaft,
   wherein the phase of the camshaft is controlled to be always positioned further toward a direction in which the intake timing of the engine is advanced, than the target phase.

2. The method of claim 1, further comprising:
   starting the engine;
   detecting a driving environment during driving the vehicle after starting the engine; and
   controlling the intake timing of the engine to be predetermined timing in accordance with the detected driving environment.

3. The method of claim 2, wherein the starting of the engine includes:
   detecting a key on;
   recognizing a target phase of the camshaft for present starting of the engine;
   comparing the phase of the camshaft with the target phase; and
   controlling the phase of the camshaft so that the intake timing of the engine is retarded if the phase of the camshaft is present further toward a direction in which the intake timing of the engine is advanced, that the target phase.

4. The method of claim 1, wherein:
   the target phase of the camshaft is an optimum phase of the camshaft for next starting after the stop of the engine.

5. The method of claim 1, wherein:
   if starting off of the engine is required during driving, the target phase of the camshaft for next starting of the engine is recognized.

6. The method of claim 2, wherein:
   if starting off of the engine is not required during driving, the driving environment is detected, and the intake timing of the engine is controlled to be predetermined timing in accordance with the detected driving environment.

7. The method of claim 1, wherein the controlling of the phase of the camshaft so that the intake timing of the engine is advanced, includes:
   comparing a rotation speed of the engine with an allowable minimum rotation speed;
   comparing a minimum advance phase of the camshaft, which allows the intake timing of the engine to be advanced to a predetermined minimum value, with the phase of the camshaft; and
   comparing a maximum advance phase of the camshaft, which allows the intake timing of the engine to be advanced to a predetermined maximum value, with the phase of the camshaft.

8. The method of claim 7, wherein:
   if the rotation speed of the engine is higher than the minimum rotation speed, the phase of the camshaft is controlled so that the intake timing of the engine is advanced, and
   if the rotation speed of the engine is not higher than the minimum rotation speed, the phase control for the camshaft ends.

9. The method of claim 8, wherein:
   in a case in which the rotation speed of the engine is higher than the minimum rotation speed,
   if the phase of the camshaft is positioned further toward a direction in which the intake timing of the engine is retarded, than the minimum advance phase, the phase of the camshaft is controlled so that the intake timing of the engine is advanced, and
   if the phase of the camshaft is not positioned further toward a direction in which the intake timing of the engine is retarded, than the minimum advance phase, the phase of the camshaft and the maximum advance phase are compared with each other.

10. The method of claim 9, wherein:
in a case in which the rotation speed of the engine is higher than the minimum rotation speed,
the phase of the camshaft is controlled to reach the maximum advance phase, and
when the phase of the camshaft reaches the maximum advance phase, the phase control for the camshaft ends.

* * * * *